INVENTOR
KONRAD EICHHOLTZ

Nov. 3, 1964
K. EICHHOLTZ
3,154,915
TURBINE JET ENGINE
Filed Feb. 5, 1962
2 Sheets-Sheet 2
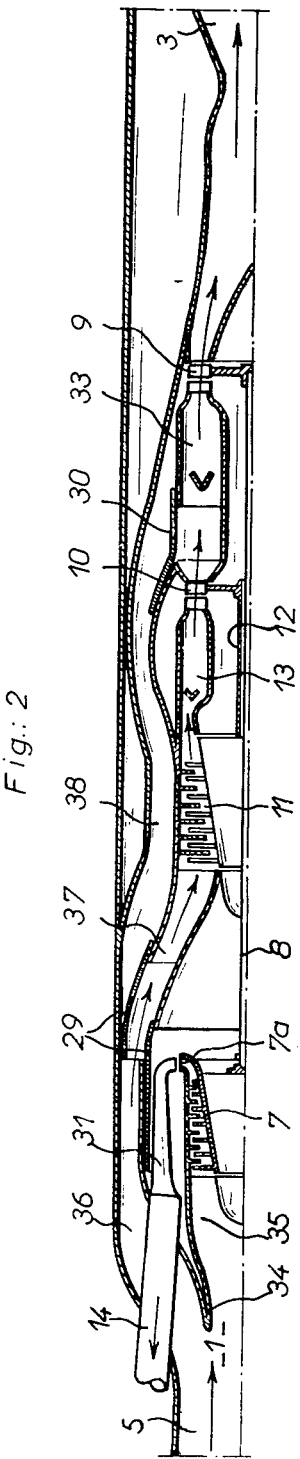
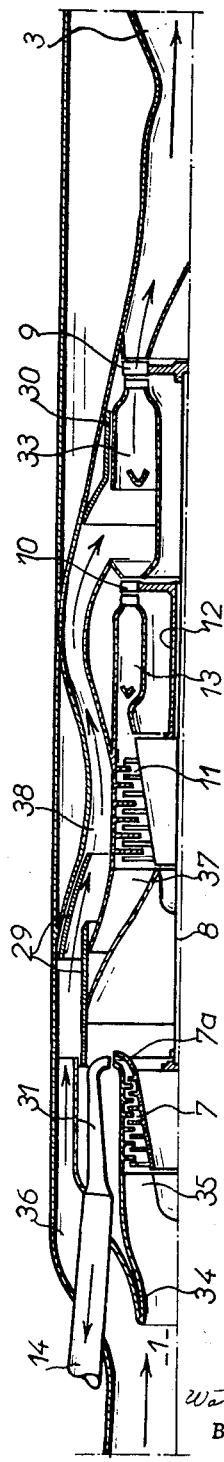
INVENTOR
KONRAD EICHHOLTZ
BY Watson, Cole, Grindle & Watson
ATTORNEY.

United States Patent Office 3,154,915
Patented Nov. 3, 1964

3,154,915
TURBINE JET ENGINE
Konrad Eichholtz, Dammaire-les-Lys, France, assignor to Societe Nationale d'Etude et de Construction de Moteurs d'Aviation, Paris, France, a company of France
Filed Feb. 5, 1962, Ser. No. 171,212
Claims priority, application France, Feb. 6, 1961, 851,793
4 Claims. (Cl. 60—35.6)

In my patent application Serial No. 152,897, filed November 16, 1961, I have described a composite power plant having two different jet propulsion ducts and efficiently operable in the subsonic as well as highly supersonic range of aircraft speed. One of these ducts— named "power duct"—is designed to operate selectively along a turbofan cycle or a ramjet cycle according as the aircraft travels at subsonic or highly supersonic speed and contains a turbine driven fan or low-pressure compressor. The other of these ducts—named "generator duct"—contains a compressed-air generator which supplies energy in pneumatic form to the former duct for driving the turbine-fan unit therein and which is itself driven by the available energy of a motive gas generator, e.g., a gas-turbine unit, housed within the latter duct.

One of the objects of the present invention is to provide for improved operation of such a power plant, in particular at still higher supersonic speed when the total pressure at the outlet of the gas-turbine unit in the latter duct becomes smaller than the total pressure at the inlet to the compressor of this unit. This phenomenon which is due to the high total temperature of the intake air, reduces the over-all efficiency of the power plant and limits its output.

Another object of this invention is to provide a power plant which will have increased power at low speed, say during take-off.

Other objects of the present invention will appear in the following description given with reference to the accompanying drawing, in which:

FIGURES 2 and 3 are longitudinal sections of the "generator" duct of such a power plant, modified in accordance with the present invention, showing two different operative positions.

Figure 1:
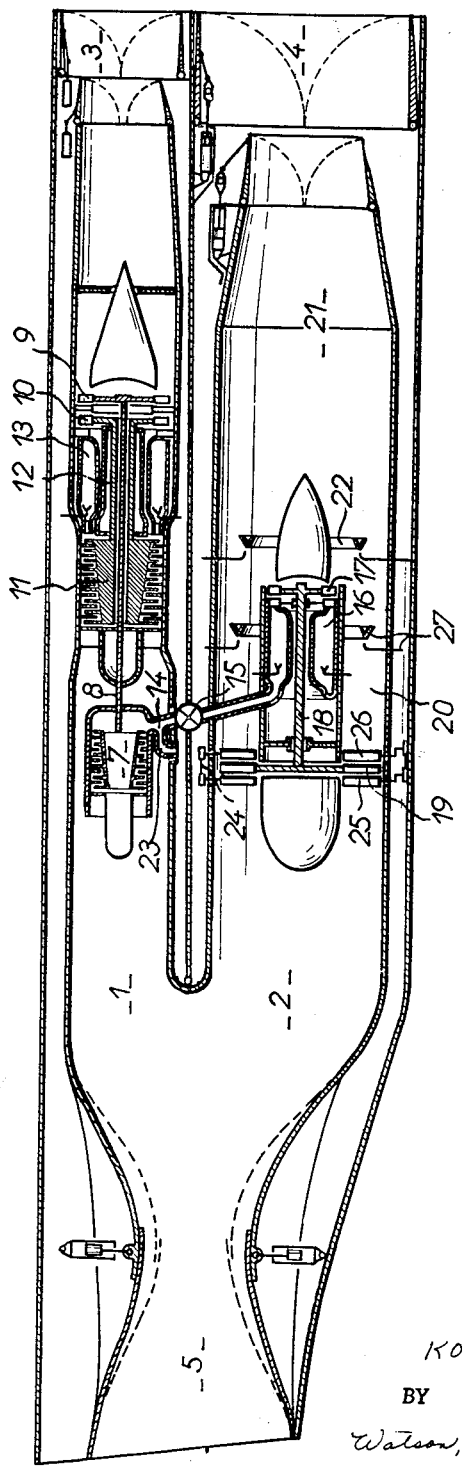
FIGURE 1 is a diagrammatic longitudinal section of a composite power plant such as disclosed in the foregoing patent application.

The composite power plant shown in FIGURE 1 comprises two separate jet propulsion ducts: a so-called "generator" duct 1 and "power" duct 2 which end respectively with separate convergent-divergent variable-area propelling nozzles 3 and 4 and which may be provided with a common convergent-divergent variable-area air intake 5.

Within the duct 1 is housed a compressor 7 the rotor of which is coupled by a shaft 8 to a free turbine 9 operating downstream of a gas generator constituted by a gas-turbine unit formed of a compressor 11, a combustion chamber 13 and a turbine 10 which drives the compressor 11 through the medium of a coaxial shaft 12, the gas being ultimately ejected through the variable-area convergent-divergent nozzle 3.

The outflow from the compressor 7 enters a conduit 14 equipped if desired with a valve 15 and debouching into a combustion chamber 16 which supplies a turbine 17. The turbine 17 is coupled, through a shaft 18, to a low-pressure compressor 19 which is provided with means 24 for changing the angular setting angle of fixed bladings denoted by 25 and 26. The turbine-compressor assembly 17–19, with its combustion chamber 16, is disposed within the duct 2. An annular duct 20, provided between the casing of this power unit and the wall of the duct 2, comprises a heating system 27 positioned within the air flow emerging from the low-pressure compressor 19. This air then mingles in the chamber 21 with the gas exhausting from the turbine 17, and this mixture may be reheated by means of the device 22 before it is ejected through the variable-area convergent-divergent nozzle 4.

At high supersonic speeds, the power duct 2 may operate without being supplied with compressed air through the generator duct 1; however, a stoppage of the whole compressed air generator unit would reduce not only the engine power, but also the efficiency of the aircraft/powerplant assembly as a whole. This would be ascribable to aerodynamic disturbances due to the absence of flow, first, in the zone downstream of the generator-duct nozzle 3 and, second, through and on exit from the power-duct turbine 17.

The present invention provides an improvement which overcomes this drawback.

This improvement is characterized by a special disposition whereby the compressed air generator driving turbine 9 is caused to co-operate with an additional combustion chamber 33. This additional combustion chamber may be supplied:

(1) At high flight Mach numbers, with highly compressed air directly from the supersonic intake 5, the gas generator being stopped and by-passed through the use of suitable valve means, and the additional combustion chamber 33 being ignited.

(2) At lower flight speeds, under moderate power loadings, by the gas generator 10 to 13, the additional combustion chamber 33 not being ignited.

(3) At low flight speeds, under conditions of engine overload such as at take-off, by the gas generator as in 2. Above, the additional combustion chamber 33, being however ignited in order to augment engine power.

Thus, at all flight speeds and under all flight conditions, the supply of compressed air to the low-pressure turbine-compressor unit 17–19 in the power duct 2 and the supply of gas to the nozzle 3 of the generator duct 1 are ensured under optimum working conditions.

In accordance with the invention, the air flow through the generator duct 1 is divided by an annular partition 34 and led into two conduits: into a central conduit 35 which contains the compressor 7 and into an annular conduit 36 which may be placed in communication either with the intake 37 of the compressor 11 (see FIG. 2) or with an annular by-pass 38 leading into the additional combustion chamber 33 (see FIG. 3). A switching device or a valve 29 is axially slidable and, depending on its position, uncovers the appropriate passageway for the air in the conduit 36, while simultaneously covering the other. Correlatively therewith, a valve 30 provides communication with or separation from the by-pass 38 and the additional chamber 33. The two valves 29 and 30 are operated by jacks (not shown), for which a single control means may be provided.

A portion of the air flowing through the intake 5 of the duct 1 reaches 35 and is then compressed by the compressor 7 which delivers it into the manifold 31 and into the pipe or pipes 14 extending across the conduit 36, thereby supplying the turbine of the low-pressure turbine-compressor unit in the power duct. The remaining portion of the air flows through the conduit 36.

Within the extended speed range from the very low subsonic to the very high supersonic speeds which the improved jet engine according to this invention is capable of imparting to the aircraft it powers, the lower flight speeds are covered by operation in the configuration of FIG. 2. The switching device 29 uncovers the conduit 37 of the gas generator and closes the inlet end of the by-pass 38 which directly supplies the additional combustion chamber 33, while the valve 30 obturates the outlet end of the by-pass.

The air in the conduit 36 is compressed by the compressor 11 and burnt in the chamber 13. The combustion gases are expanded first in the turbine 10 driving the compressor 11, then in the turbine 9 driving the compressor 7 and ultimately in the nozzle 3 through which they are ejected. Afterburning may be provided in the chamber 33 for unusually high power requirements.

The upper range of flight speeds is provided by operation in the configuration of FIG. 3. The switching device 29 closes the gas generator conduit 37 and uncovers the inlet port to the by-pass 38, while the valve 30 opens the by-pass outlet port in the chamber 33. The air in the conduit 36, which has already been heavily compressed in the supersonic intake, owing to the high flight Mach number involved, supplies the chamber 33 which is ignited. The combustion gases are expanded, first in the turbine 9 driving the compressor 7, then in the nozzle 3, through which they are ejected. The gas generator rotor 10–11–12 is stopped.

It will be noted that the last stage 7a of the compressor 7 is of the centrifugal type, with a view to facilitating delivery of the compressed air forward through the conduit 14.

What is claimed is:

1. A jet propulsion power plant comprising a duct with an air intake at one end thereof and a nozzle at the other end thereof, and, inside said duct: a motive gas generator adapted to suck air from said intake and discharge motive gas, a turbine-compressor assembly mechanically independent of said gas generator, the compressor of said assembly being adapted to suck air from said intake and to discharge outside said duct while the turbine of said assembly is adapted to be fed with motive gas from said gas generator and to exhaust toward said nozzle, a conduit by-passing said gas generator and adapted to lead air from said intake to a point intermediate said gas generator and said turbine, a combustion chamber connected with the inlet of said turbine and adapted to be fed with air from said by-pass conduit, and first valve means for selectively directing air from said intake into said gas generator or said by-pass conduit and combustion chamber.

2. Power plant as claimed in claim 1, wherein said combustion chamber extends between the discharge end of said gas generator and the inlet end of said turbine, said power plant comprising second valve means operable in conjunction with said first valve means and controlling the connection between said by-pass conduit and said combustion chamber.

3. Power plant as claimed in claim 1, comprising further an annular passage connecting said air intake with said by-pass conduit and surrounding said compressor, and a compressor discharge pipe extending from the discharge end of said compressor across said annular passage, and outwardly of said duct.

4. Power plant as claimed in claim 3, wherein the compressed air flow direction through said discharge pipe is substantially opposite to the general air flow direction through said compressor, and wherein said compressor comprises a last centrifugal stage.

References Cited in the file of this patent

UNITED STATES PATENTS

| | | |
|---|---|---|
| 2,409,177 | Allen et al. | Oct. 15, 1946 |
| 2,600,235 | Galliot | June 10, 1952 |
| 2,909,894 | O'Donnell | Oct. 27, 1959 |
| 2,989,843 | Ferri | June 27, 1961 |